United States Patent
Murray

(10) Patent No.: US 9,340,230 B2
(45) Date of Patent: May 17, 2016

(54) VEHICLE CRASHWORTHINESS

(75) Inventor: Ian Gordon Murray, Puttenham (GB)

(73) Assignee: GORDON MURRAY DESIGN LIMITED (GB)

( * ) Notice: Subject to any disclaimer, the term of this patent is extended or adjusted under 35 U.S.C. 154(b) by 0 days.

(21) Appl. No.: 13/809,708

(22) PCT Filed: Jul. 14, 2011

(86) PCT No.: PCT/GB2011/001064
§ 371 (c)(1),
(2), (4) Date: Mar. 7, 2013

(87) PCT Pub. No.: WO2012/007726
PCT Pub. Date: Jan. 19, 2012

(65) Prior Publication Data
US 2013/0161932 A1 Jun. 27, 2013

(30) Foreign Application Priority Data
Jul. 14, 2010 (GB) .................................. 1011817.2

(51) Int. Cl.
*B62D 21/15* (2006.01)
*B60R 19/00* (2006.01)

(52) U.S. Cl.
CPC ................ *B62D 21/15* (2013.01); *B60R 19/00* (2013.01); *B60G 2206/016* (2013.01)

(58) Field of Classification Search
CPC ...... B62D 21/15; B62D 21/152; B60R 19/00; B60R 19/16; B60R 19/24; B60G 2206/016
USPC ........................................................ 280/784
See application file for complete search history.

(56) References Cited

U.S. PATENT DOCUMENTS

| 4,090,721 A | 5/1978 | Wedin |
| 4,763,939 A * | 8/1988 | Zhu ................................ 293/17 |

(Continued)

FOREIGN PATENT DOCUMENTS

| DE | 4326668 A1 | 2/1995 |
| DE | 10102212 A1 | 8/2002 |

(Continued)

OTHER PUBLICATIONS

GB Search Report; GB1011817.2; 2010-20-19.
International Search Report and Written Opinion; PCT/GB2011/001064; Sep. 19, 2011.

*Primary Examiner* — Paul N Dickson
*Assistant Examiner* — Timothy Wilhelm
(74) *Attorney, Agent, or Firm* — Westman, Champlin & Koehler, P.A.; Z. Peter Sawicki; Amanda M. Prose

(57) ABSTRACT

A chassis for a vehicle has a locally narrower portion within which is mounted a wheel, and a rigid member extending from the chassis toward the quiescent position of the wheel and ending at a point which is spaced radially from the outer profile and located axially within the thickness of the wheel. Under an impact, the wheel itself will be crushed against the rigid member, absorbing some of the impact energy. The impact energy can also be transmitted via the rigid member to the remainder of the chassis, providing a load path to major mass concentrations elsewhere in the vehicle and allowing energy to be dissipated by the deformation of other structures elsewhere. This can then limit frontal damage to the vehicle and hence reduce the risk of intrusions into the passenger cell. The rigid member can be a column extending towards the wheel, and can end with a flat plate that is positioned tangentially to a local portion of the outer profile. It preferably extends from a point on the chassis outside the locally narrower portion. Oriented in this direction, the rigid member is more able to transfer the impact forces from the crushing wheel to the remainder of the chassis.

12 Claims, 3 Drawing Sheets

(56) References Cited

U.S. PATENT DOCUMENTS

| | | | |
|---|---|---|---|
| 5,427,214 A * | 6/1995 | Prottengeier et al. | 188/374 |
| 5,462,324 A * | 10/1995 | Bowen et al. | 293/15 |
| 5,468,033 A * | 11/1995 | Dohrmann et al. | 293/133 |
| 6,068,330 A * | 5/2000 | Kasuga et al. | 296/187.09 |
| 6,196,621 B1 * | 3/2001 | VanAssche et al. | 296/187.09 |
| 6,364,358 B1 | 4/2002 | Miller | |
| 7,717,465 B2 * | 5/2010 | Hedderly | 280/784 |
| 2002/0008375 A1 * | 1/2002 | Iyanagi et al. | 280/784 |
| 2003/0141712 A1 | 7/2003 | Miyasaka | |
| 2006/0244287 A1 * | 11/2006 | Baumann et al. | 296/187.09 |
| 2011/0024221 A1 * | 2/2011 | Murray | 180/312 |

FOREIGN PATENT DOCUMENTS

| | | |
|---|---|---|
| DE | 102004021165 A1 | 11/2005 |
| EP | 0970879 A2 | 1/2000 |
| WO | 2009077079 A1 | 6/2009 |

\* cited by examiner

VEHICLE CRASHWORTHINESS

CROSS-REFERENCE TO RELATED APPLICATION

This application is a Section 371 National Stage Application of International Application No. PCT/GB2011/001064, filed Jul. 14, 2011 and published as WO/2012/007726 A1 on Jan. 19, 2012, in English, which claims priority to GB Application No. 1011817.2, filed Jul. 14, 2010, the contents of which are hereby incorporated by reference in their entirety.

FIELD OF THE INVENTION

The present invention addresses issues of vehicle crashworthiness.

BACKGROUND ART

It is an unfortunate but inevitable fact that from time to time, for a range of reasons, vehicles crash. In such circumstances, the design of the vehicle is a significant factor in whether the occupants survive and, if so, whether and to what degree they are injured.

Care is therefore required in the design of vehicles, to ensure that adequate protection is offered to the driver and passengers under a severe impact. Crumple zones are common, being an energy-absorbing structure within the vehicle chassis that is designed to deform under impact and (in doing so) absorb the energy of the impact.

Particular difficulty is encountered in relation to small city cars, since their small dimensions mean both that there is little space for energy-absorbing structures and that the vehicle occupants are physically closer to the point of impact. The "Smart Car" (as sold in various markets by MCC Smart GmbH from 1998 onwards) employed a rigid safety cell around the occupants in combination with a small crumple zone, the intention being to deflect the impact energy around the occupants whilst it is being absorbed by the (assumed) larger crumple zone of an impacting vehicle.

WO2009/077079 addresses the specific problem of the wheels intruding into the passenger cell, by locating a crumple zone behind the front wheels, defining the rear portion of the wheel arch. A wheel that is forced rearwards in a frontal collision is caught by the crumple zone and made less likely to enter the passenger cell where it might injure an occupant.

SUMMARY OF THE INVENTION

The present invention provides a chassis for a vehicle having a locally narrower portion within which is mounted at least one wheel, the wheel having a quiescent position, a thickness, an axis about which it rotates, and a substantially circular outer profile, the chassis further comprising a rigid member extending from the chassis toward the quiescent position of the wheel and ending at a point which is, when the wheel is in its quiescent position, spaced radially from the outer profile and located axially within the thickness of the wheel.

The effect of this is that under an impact, the wheel itself will be forced back until it meets the rigid member. At that point, the wheel will be crushed between the rigid member and the impacting object, thereby absorbing some of the impact energy in addition to that absorbed by any other crumple zones provided in the vehicle. The impact energy can also be transmitted via the rigid member to the remainder of the chassis, providing a load path to major mass concentrations elsewhere in the vehicle and (potentially) dissipating the energy by the deformation of other structures elsewhere. This can then limit frontal damage to the vehicle and hence reduce the risk of intrusions into the passenger cell.

The wheel to which this is applied will usually be a front wheel or wheels of the vehicle, i.e. one located in a frontal portion of the chassis, in which case the rigid member will be located behind the wheel.

The rigid member can be a column extending towards the wheel, and can end with a flat plate that is positioned tangentially to a local portion of the outer profile. It preferably extends from a point on the chassis outside the locally narrower portion, which means that it can extend in a direction transverse to the axis of rotation of the wheel, or longitudinally with respect to the chassis. Oriented in this direction, the rigid member is more able to transfer the impact forces from the crushing wheel to the remainder of the chassis.

Most wheels are mounted to the chassis via a suspension, so the quiescent position will be one in which the suspension is supporting the vehicle weight. Equally, most front wheels are steerable, so the quiescent position will be that occupied when the wheel is in a straight ahead position.

The wheel will usually comprise a metallic rim on which is mounted a resilient tyre, which (together) do in fact provide a good energy-absorbent structure.

The chassis can be one constructed from a plurality of tubular members. Planar members can be affixed to the tubular members in order to provide additional rigidity.

BRIEF DESCRIPTION OF THE DRAWINGS

An embodiment of the present invention will now be described by way of example, with reference to the accompanying figures in which.

DETAILED DESCRIPTION OF THE EMBODIMENTS

Figure 1:
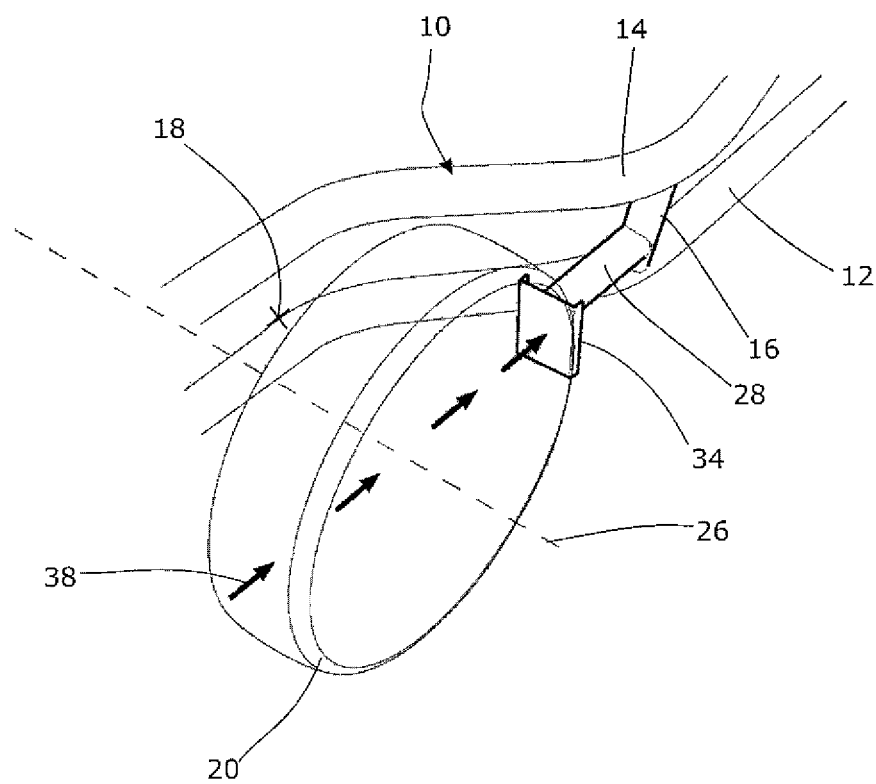
FIG. 1 shows an isometric view of part of a vehicle chassis according to the present invention.
Figure 2A:
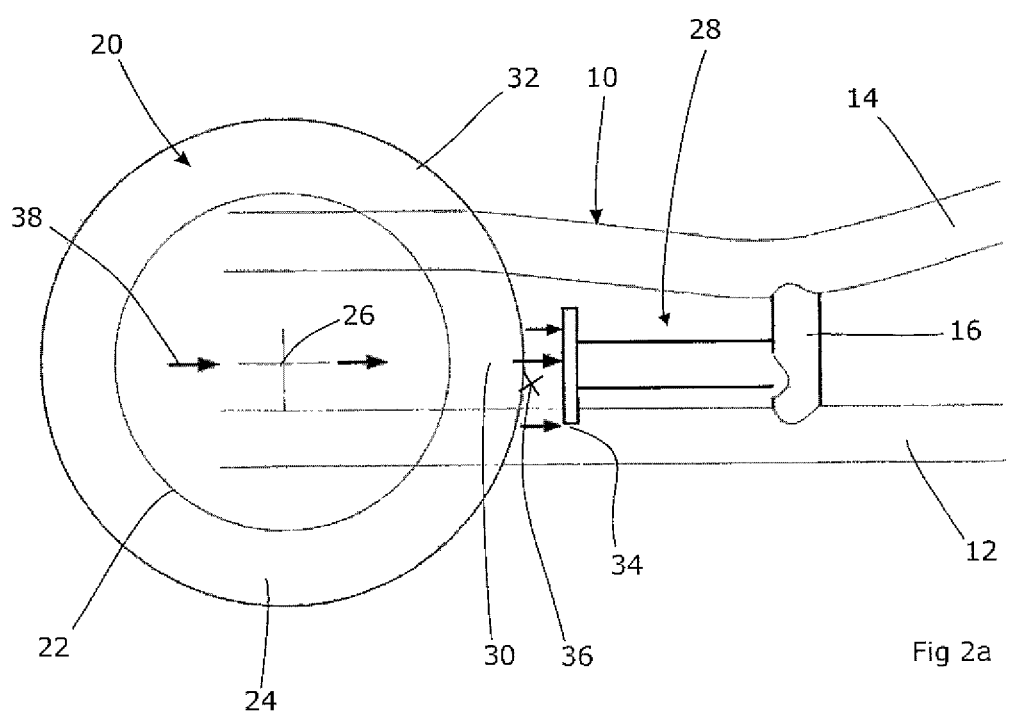
FIG. 2a shows a side view of the part chassis of FIG. 1.
Figure 2B:
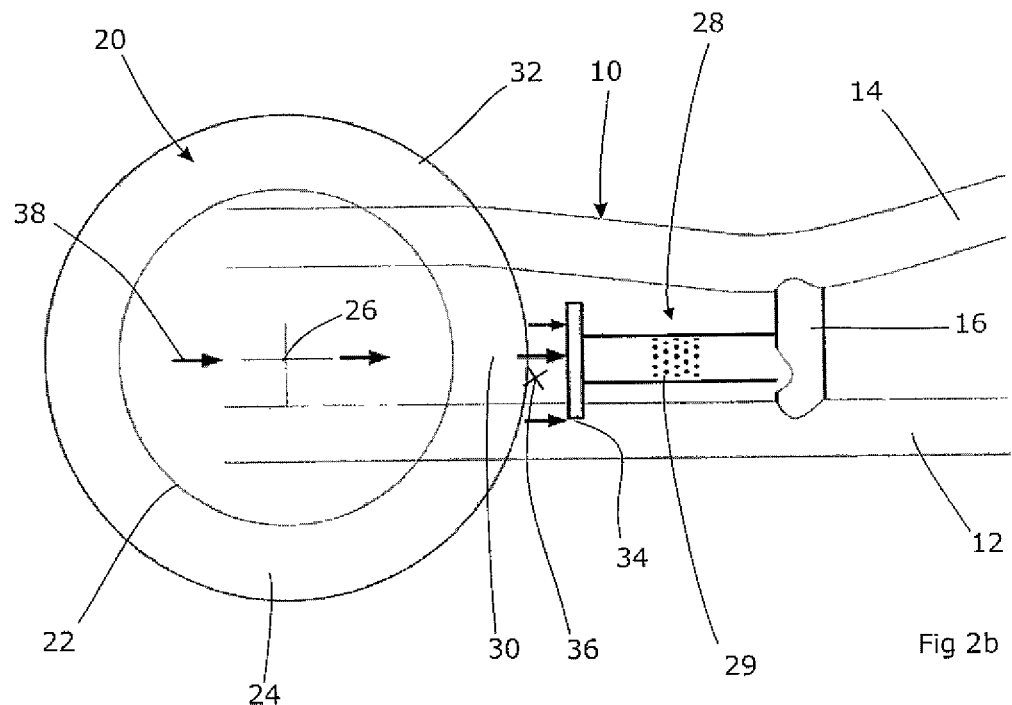
FIG. 2b shows a side view of a part chassis according to another embodiment of the present invention.
Figure 3:
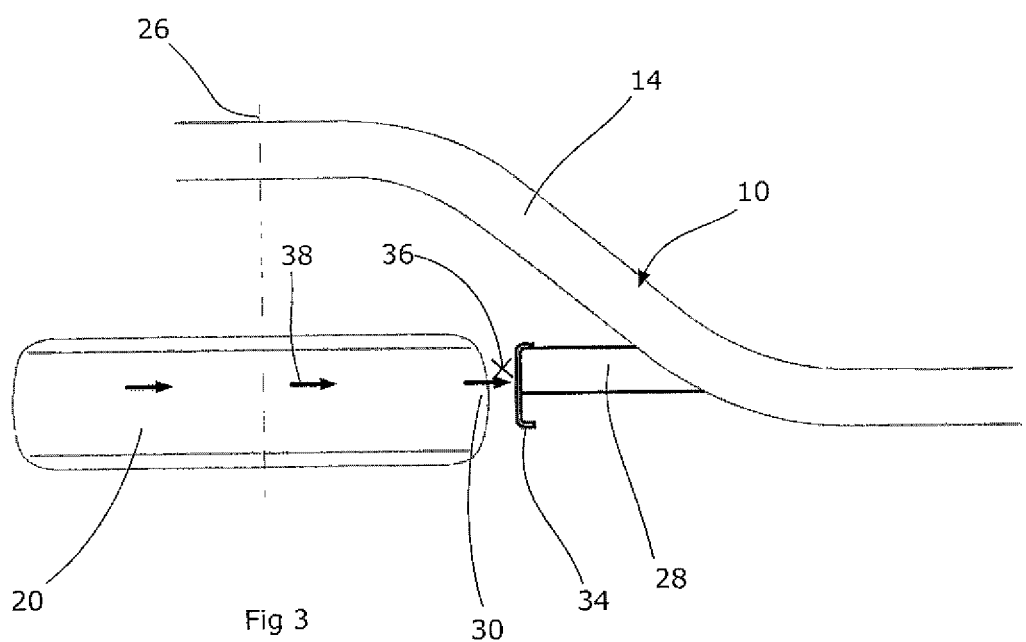
FIG. 3 shows a plan view of the part chassis of FIG. 1.

FIGS. 1, 2a and 3 show an embodiment of the invention. A chassis 10 is shown (in part); this is made up of a three-dimensional framework of tubular members 12, 14 that run in a generally longitudinal direction and are linked by vertical tubular struts 16 and cross-members (not shown). Planar members are attached to the tubular members and offer additional rigidity by allowing forces to be transmitted between the various tubular members making up the chassis 10. The chassis is that described in our earlier application GB2458956A, to which the reader's attention is directed in order to obtain a full understanding of the chassis illustrated in FIGS. 1 to 3 and which is hereby incorporated by reference.

The longitudinal members 12, 14 bend inwardly to define a locally narrowed portion 18 on the left-hand side of the vehicle (as viewed by the driver). A wheel 20 is supported within the locally-narrowed portion 18, being one of the four wheels on which the vehicle runs. The wheel 20 is a front wheel, steerable to allow directional control of the vehicle in the conventional manner. It is illustrated in its quiescent position, i.e. with the steering set in the straight ahead position and with the suspension (not shown) by which it is attached to the chassis loaded, supporting the remainder of the vehicle at its kerb weight.

The wheel can be conventional in construction, comprising an inner metallic (steel or alloy) rim 22 around which is provided a tyre 24. It rotates around an axis 26, which will obviously move as the wheel is steered, but which is shown when the wheel is in its quiescent position.

A rigid column 28 extends longitudinally forward from the vertical strut 16, at the same height as the wheel axis 26. At the location of the vertical strut 16, the chassis is wider than at the locally narrowed portion 18, so the rigid column 28 can extend in a longitudinal direction, transverse to the wheel's rotation axis 26, directly towards the rearmost point 30 of the outer edge 32 of the wheel 20. The column 28 ends with a flat plate 34 that is aligned vertically, i.e. tangential to the rearmost point 30 of the wheel 20. The length of the column 28 is such as to leave a clearance 36 between the plate 34 and the rearmost point 30 of the wheel 20, sufficient to allow for movement of the wheel 20 on the suspension during normal driving.

Under a severe frontal impact, the wheel 20 may be forced back in the direction of arrows 38. This will cause it to take up the clearance 36, after which it will impact the flat plate 34. The column 28 is of sufficient strength to allow the wheel 20 to be crushed between the column 28 and whatever is impacting the vehicle. This will absorb a certain amount of energy from the impact. In an embodiment, the column 28 is tubular.

In addition, the rigidity of the column 28 means that a load path is provided for the impact forces to be transmitted into the chassis 10. This will then allow the impact forces to be distributed across the chassis to other mass concentrations—in this case at the rear of the vehicle. Further impact energy will therefore be dissipated by deforming structural elements behind the cabin area, thereby helping to limit frontal damage and protect the occupants. As the column 28 is a discrete structural column, it is straightforward to tune its physical characteristics such as diameter, thickness, length, material choice etc in order to optimise the "pulse" of force that is transferred into the main structure. The crash response of the vehicle as a whole can therefore be adjusted as required. It will be noted that in this embodiment the column 28 has a higher crush strength along its longitudinal axis than the crush strength of the wheel, i.e. such that the wheel is crushed preferentially to the column 28. As a matter of practical reality, however, the forces involved in an impact may be sufficiently high that the column 28 is also deformed, despite its description as "rigid".

In another embodiment, illustrated in FIG. 2b, the column 28 comprises an area 29 which is deliberately weakened relative to the rest of the column 28. In the illustrated embodiment this is provided by way of a plurality of holes machined in the column 28. Those skilled in the art will of course be familiar with alternative methods of achieving this weakening (e.g. through the inclusion of ribs at an angle transverse to the longitudinal axis of the column 28), and the present invention is not limited to the illustrated embodiment. This weakened area promotes deformation of the column 28 under impact, which may also serve to dissipate the forces of a crash.

Thus, providing a rigid wheel-catcher of these types behind the wheel 20 allows for improved crashworthiness of the vehicle as a whole. This is also a very compact measure, requiring little additional space or weight, and which is therefore suited to a compact city car.

There will of course be a similar structure on the opposite side of the vehicle, in respect of the wheel on the right-hand side of the vehicle (as viewed by the driver).

In addition, or as an alternative, a similar arrangement could be made for the rear wheels. This would assist in dealing with rear shunts to the vehicle.

It will of course be understood that many variations may be made to the above-described embodiment without departing from the scope of the present invention.

The invention claimed is:

1. A chassis for a vehicle having a locally narrower portion within which is mounted at least one wheel, the wheel having a quiescent position, a thickness, an axis about which it rotates when in the quiescent position, and a substantially circular outer profile, the chassis further comprising a rigid member in the form of a column extending from the chassis toward the quiescent position of the wheel and ending at a point which is, when the wheel is in its quiescent position, spaced radially from the outer profile and located axially within the thickness of the wheel, wherein the rigidity of the rigid member provides a path for impact forces to be transmitted from the wheel into the chassis, and wherein the structure of the chassis is defined by a plurality of tubular members forming a three-dimensional framework of tubular members that run in a generally longitudinal direction and are linked by vertical tubular struts with planar members affixed thereto, the planar members allowing forces to be transmitted between the tubular members making up the chassis, the rigid member extending from said vertical tubular strut, wherein the rigid member has a crush strength in a direction parallel to its longitudinal axis which is greater than the crush strength of the wheel.

2. The chassis for a vehicle according to claim 1 in which the wheel is located in a frontal portion of the chassis, and the rigid member is located behind the wheel.

3. The chassis for a vehicle according to claim 1, wherein the column is tubular.

4. The chassis for a vehicle according to claim 1 in which the column ends with a flat plate positioned tangentially to a local portion of the outer profile.

5. The chassis for a vehicle according to claim 1 in which the rigid member extends from a point on the chassis outside the locally narrower portion.

6. The chassis for a vehicle according to claim 5 in which the rigid member extends in a direction transverse to the axis of rotation.

7. The chassis for a vehicle according to claim 5 in which the rigid member extends in a direction that is longitudinal with respect to the chassis.

8. The chassis for a vehicle according to claim 1 in which the wheel is mounted to the chassis via a suspension, wherein the quiescent position suspension is supporting the vehicle weight.

9. The chassis for a vehicle according to claim 1 in which the wheel is steerable, wherein the quiescent position of the wheel is that occupied when the wheel is in a straight ahead position.

10. The chassis for a vehicle according to claim 1 in which the wheel comprises a metallic rim on which is mounted a resilient tire.

11. The chassis for a vehicle according to claim 1, wherein the rigid member comprises an area of lower strength so as to aid in deformation.

12. The chassis for a vehicle according to claim 11, wherein the area of lower strength comprises a plurality of holes machined in the rigid member.

\* \* \* \* \*